United States Patent Office 2,897,117
Patented July 28, 1959

2,897,117

INSULIN PROCESS

Robert Gordon Romans, Toronto, Ontario, Canada, assignor to The Governors of the University of Toronto, Toronto, Ontario, Canada No Drawing. Application February 10, 1955
Serial No. 487,449

12 Claims. (Cl. 167—75)

This invention relates to the preparation from pancreas glands of a crude Insulin product which is useful as a source material for the preparation of purified Insulin.

It is a primary object of the invention to provide a process for the preparation of a crude Insulin product with high yields. I attribute these high yields to a number of reasons, but particularly to the fact that my method extracts very high quantities of Insulin from the glands and avoids certain of the losses which occur in prior processes. It is a further object of my invention to avoid the losses occurring in prior concentration procedures, by concentrating an aqueous alcoholic solution of Insulin in the presence of a high percentage saturation of the solution with salt. It is a further object of my invention to extract and to concentrate solutions of Insulin under conditions of mild acidity.

In prior Insulin extraction procedures, it has been thought necessary that the extraction be carried out under strong acid conditions; and while salts have been used to salt out the Insulin from concentrated solutions, the presence of salts has been avoided during the extraction and concentration procedures for obtaining the concentrated solutions. I have discovered the surprising fact that the presence of salt in an alcoholic extracting solution makes such a solution capable of a highly efficient extraction of Insulin from pancreas glands. I have discovered further that the presence of the salt during the concentration of the alcohol extract of Insulin facilitates the concentration and avoids losses which otherwise occur.

In accordance with my invention, Insulin-containing pancreas glands are extracted with an aqueous salt-alcohol solution under mildly acid conditions, preferably by successive extraction steps, with at least the first extraction step desirably conducted in the presence of excess salt. The salt-alcohol extract is recovered from the solid material, is treated to remove fat, and the Insulin contained in the fat-free solution is then recovered therefrom.

The alcohol used for the extraction may be an alcohol commonly used in prior acid-alcohol processes, preferably methyl alcohol, ethyl alcohol, or denatured ethyl alcohol, or a mixture of such alcohols. Use of these preferred alcohols results in a single-phase extraction fluid. An undesirable two-phase extraction fluid results when n-propyl alcohol or iso-propyl alcohol is used. The alcohol used is desirably of such strength and used in such an amount that after dilution with the water contained in the gland material the alcohol extract will have an alcohol concentration in a range of 45% to 75%, and most desirably at about 65% to 70%. At concentrations of 80% and higher, there is not only a loss in potency recovered but also an excessive increase in the volume of extractant required.

The salt used should be such as to give the aqueous alcohol solution a high capacity to dissolve Insulin. Preferably, it should also be salt which is effective as a salting-out agent for salting out Insulin from aqueous solutions. The salt used may be a single salt or a mixture of suitable salts. The preferred salt to be used is sodium chloride, for it gives the aqueous alcohol solution a high Insulin solubility, it is highly effective as a salting-out agent, and it is relatively inexpensive. Other salts which can be used include ammonium chloride and calcium acetate. Potassium salts are excessively expensive. Salt should be used in an amount sufficient to provide at least about half saturation of the total aqueous alcohol extracts obtained from the succession of extraction steps. Preferably sufficient salt is used to saturate the total combined extracts. The amount of salt used in the first extraction step is preferably at least sufficient to saturate the aqueous alcohol extract obtained from that first extraction, and the total amount of salt for all of the successive extraction steps may be used in the first extraction step.

In conducting my process, I prefer not to mix the alcohol and glands without having the salt present at the time of such mixing. Subject to this limitation, the constituents of the extraction mixture may be brought together in any convenient order. Ordinarily, I mix the glandular material with a previously prepared mixture of the salt and alcohol, but I may first mix the salt and the glandular material and then add salt-free alcohol or alcohol containing additional salt. Whatever the particular order of mixing the components, the extraction mixture should be an aqueous mixture which includes both salt and alcohol. It is extraction in such a mixture which I refer to as extraction with an aqueous "salt-alcohol" solution.

The extraction may be carried out over a wide pH range, as from pH 3.5 to pH 6.5. In the absence of special steps to control the pH, the acidity will normally fall within that range and rise during the extraction toward the upper end of that range. I have found it preferable to control the acidity and to maintain a pH of about pH 5.0 to 5.2 throughout the extraction procedure, as by the addition of an acid, such as hydrochloric acid. The acid may be added in any convenient order with respect to the mixture of the salt, alcohol, and gland material. I prefer to add acid after the admixture of the other components.

The amount of alcohol used depends on the extent to which complete extraction is desired, and the maximum amount is limited primarily by economic factors. For efficient extraction, the amount of alcohol present in each extraction step should be sufficient, in comparison with the amount of water present, to provide in the separated extract an alcohol concentration between about 45% and about 75%, and preferably between 65% and 70%. For high yields, it is desirable to carry out the extraction in a plurality of steps, using a stronger alcohol solution for the first step than for subsequent steps. Starting with about 600 pounds of gland material, I preferably make a first extraction with about 150 imperial gallons of 90% to 95% alcohol in the presence of about 100 pounds of sodium chloride, and make two subsequent extractions each with about 75 gallons of a 70% aqueous alcohol solution. In this case, the original amount of salt is sufficient for all three extractions.

Each extraction is carried out in accordance with usual extraction procedure, with stirring of the extraction mixture over a period of time. The acidity of the mixture is taken periodically, and acid added as necessary to maintain the desired pH value. The liquid extract is then separated from the mixture, and contains the extracted Insulin. The solids are either re-extracted or discarded.

The aqueous salt-alcohol extracts from several extractions may be combined, and are treated to remove fat.

The fat is preferably removed by means of a fat solvent, and its removal may be carried out in various ways. Desirably, the combined aqueous alcohol extracts are concentrated under vacuum distillation to reduce the alcohol concentration to about 20% to 35%, most desirably to about 25% to 30%. At this concentration, the Insulin is still substantially completely soluble in the aqueous alcohol, the fat solubility is substantially reduced, and the aqueous alcohol is substantially immiscible with desirable fat solvents. The combined and concentrated extract is now mixed with a sufficient quantity of an immiscible fat solvent to remove the fat. I find it convenient to use from 5% to 15%, most desirably about 9%, of a high boiling petroleum ether, having a boiling range of 190° F. to 270° F. The mixture is allowed to separate into layers, and the alcohol-water layer containing the Insulin is recovered.

Alternatively, fat may be removed from the combined extracts or from the combined and partially concentrated extracts by treatment with other fat solvents. When fat solvents such as carbontetrachloride, trichloroethylene, or tetrachlorethylene are used, I desirably concentrate the original combined extracts to about half volume, that is, leaving a higher concentration of alcohol, then treat with the fat solvent, and then add water to reduce the alcohol concentration to the same point of about 25% to 30% obtained in the concentration step used with petroleum ether. Such procedure aids in keeping the Insulin in solution and produces a clean separation of the fat solvent from the Insulin-containing extract. To insure complete freedom from fat and to obtain a crystal clear solution, the Insulin-containing extract may be filtered after the primary fat removal.

The partially concentrated and fat-free extract is now treated to recover a crude Insulin preparation. Preferably, this is done by further concentration of the solution by vacuum distillation, to remove completely or substantially completely the remaining alcohol and to increase the concentration of the salt to a point at which it "salts-out" the Insulin from the solution. If desired, additional salting-out agent, such as an additional amount of the original salt used, may be added to facilitate the salting-out step. The solid material precipitated from the solution is suitably recovered, as by filtration, and is the desired crude Insulin preparation. This may be purified in known manner to obtain an Insulin product suitable for clinical use.

The following are examples of my process for the extraction of Insulin from pancreas in the presence of salt and under mildly acid conditions.

*Example 1.—Beef pancreas, with ethyl alcohol and sodium chloride*

Eight 600-pound quantities of frozen beef pancreas were each minced into 150 imperial gallons of 92% ethyl alcohol to which had previously been added 100 pounds of sodium chloride. The mixtures were agitated for two hours during which time muriatic acid was added in such quantities as to maintain the acidities between pH 5.0 and 5.2. Approximately 2500 cc. were required for each quantity of glands. The meat residues and the extracts were separated using a continuous bowl centrifuge. The extracts contained an alcohol concentration of about 70%, and were substantially saturated with sodium chloride.

The meat residues from 1200-pound quantities of pancreas, that is, from two of the preceding extractions, were combined and were re-extracted with 150 gallons of 70% ethyl alcohol. This extraction was continued approximately thirty minutes, and during this period, muriatic acid was added to maintain the acidity between pH 5.0 and 5.2. This required approximately 500 cc. of muriatic acid for each quantity of meat residue. The meat residues and extracts were separated using a continuous bowl centrifuge. These second extracts contained an alcohol concentration of about 70%, and were substantially saturated with salt.

The meat residues were again extracted in a similar manner with 150 gallons of 70% ethyl alcohol. The step-wise addition of 500 cc. of muriatic acid was required to maintain the acidities between pH 5.0 and 5.2 for the thirty-minute extractions. After this time, the extracts were separated from the meat residues. These third extracts contained an alcohol concentration of about 70%, and were substantially saturated with salt.

All the extracts obtained from these procedures were combined and filtered in a plate-and-frame filter press, using filter aid. This resulted in 2390 gallons of clear filtrate.

One-hundred gallon quantities of this clear filtrate were reduced in volume by vacuum distillation in a pot still to approximately 32 gallons. The distillation residues were combined to give a partial concentrate having a volume of 757 gallons with an alcohol concentration of 30% to 31%.

The combined residue was treated to remove fat. To it were added, while stirring, 37.5 gallons of a petroleum ether fraction having a boiling range of 190° to 270° F. The resulting mixture formed two layers, which were separated in a centrifuge. The alcohol layer contained the active material. This was recovered in a volume of 735 gallons, and was polished or clarified by filtration using filter aid in a plate-and-frame filter press. The filter cake was washed with 30 gallons of 25% aqueous alcohol, and the wash liquid was added to the filtrate.

The 760 gallons of filtrate thus obtained were further concentrated to 360 gallons by evaporation in a pot still, which caused the formation of a solid precipitate. This solid precipitate was the desired crude Insulin product, and was recovered by running the mixture through the collecting bowl of a centrifuge.

This crude Insulin product was then purified. The precipitate was dissolved in 180 litres of water made acid to pH 3.0 with hydrochloric acid, and the resulting mixture was filtered to remove insoluble material. The filter cake was washed with sufficient acid water to make the volume of the filtrate 220 litres. The crude Insulin protein was contained in the filtrate, and this was again precipitated by the addition of sodium chloride to a concentration of 8%. The precipitate was recovered.

The precipitate was dissolved in 180 litres of dilute hydrochloric acid, and sodium chloride was added to a concentration of 8%. The acidity of the mixture was adjusted to pH 6.8 by the slow addition of dilute ammonium hydroxide. The material was filtered, and the Insulin activity was recovered from the clear filtrate by readjusting the acidity to pH 3.0 by the addition of hydrochloric acid. The residue from the filtration at pH 6.8 was retreated three times by the same process, using successively decreasing volumes of dilute hydrochloric acid.

Four precipitates were thus obtained from the filtrations at pH 3.0. These were combined, and were processed by an ammonium acetate-acetone fractionation at pH 5.9, and by a crystallization from ammonium acetate buffer by the known method of Romans, Scott and Fisher, Indust. Eng. Chem. 32, 908 (1940). Zinc-Insulin crystals calculated to amount to 1520 units per pound of pancreas were obtained, together with a small quantity of biologically active amorphous material.

*Example 2.—Beef pancreas, with ethyl alcohol and sodium chloride*

Thirty-seven and one-half pounds of sodium chloride were added to 25 imperial gallons of 92% ethyl alcohol and the mixture was stirred. One-hundred pounds of frozen beef pancreas were minced into this extracting fluid at which time 280 cc. concentrated hydrochloric acid were added. The acidity of the mixture was pH 4.8. The mixture was stirred three hours during which time hydrochloric acid was added in sufficient quantities to keep the acidity between pH 4.8 and 5.0. The total addition of acid amounted to 505 cc. The mixture was allowed to stand over night. The meat residue and the extract were separated, using a plate-and-frame filter press.

The meat residue was re-extracted in 25 gallons of 70% aqueous alcohol for four hours. During this extraction no further addition of acid was required since the acidity was pH 5.1. The meat residue and the extract were filtered.

The meat residue was again extracted with 25 gallons of 70% aqueous alcohol for five hours. No further addition of acid was required. The meat residue was separated from the extract and was discarded.

The three extracts, having a total volume of about 76 gallons, were combined and clarified, and the clarified extract, amounting to 71 gallons was reduced to 32 gallons by vacuum distillation. Four gallons of carbon tetrachloride and 19.6 gallons of water were added while stirring. The resulting mixture was separated using a centrifugal separator. The active alcohol phase was filtered using filter aid and resulting in 52 gallons of defatted extract.

The defatted extract was concentrated by vacuum distillation to 11.25 gallons. To the mixture of concentrate and precipitate which had formed therein, sufficient hydrochloric acid was added to adjust the acidity to pH 2.5 and sufficient sodium chloride was added to saturate the mixture. The mixture was allowed to stand. A precipitate of active material formed, which was the desired crude Insulin product. This was recovered by filtration, was dissolved in 20 litres of dilute hydrochloric acid water, and the resulting mixture was filtered. Sodium chloride was added to the filtrate to a concentration of 15%, which caused precipitation of the biologically active Insulin protein. This salt precipitate was recovered and it was dissolved in one litre of distilled water. Biological assay of this liquid showed Insulin activity equivalent to 2000 units per pound of original pancreas.

*Example 3.—Pork pancreas, with ethyl alcohol and sodium chloride*

Eight 600-pound quantities of frozen pork pancreas were each minced into 150 imperial gallons of 92% ethyl alcohol to which had previously been added 100 pounds of sodium chloride. The mixtures were stirred for two hours, during which time muriatic acid was added in sufficient quantities to maintain the acidity between pH 5.0 and 5.2.

The re-extracting, defatting and concentrating were carried out as in Example 1, to obtain a final still concentrate in which the desired crude Insulin product occurred as a solid precipitate.

The final still concentrate was allowed to stand and settle. The clear supernatant liquid was decanted through a filter press followed by the precipitate, after the addition of filter aid. The precipitate so recovered was dissolved in water made acid to pH 3.0 by the addition of hydrochloric acid. Biological assay of the resulting solution showed Insulin activity equivalent to 2200 units per pound of pancreas.

*Example 4.—Pork pancreas, with methyl alcohol and sodium chloride*

Forty grams of minced frozen pork pancreas were added to 100 cc. of 92% aqueous methyl alcohol to which 15 grams of sodium chloride had been added. Four drops of concentrated hydrochloric acid were added to bring the acidity of the mixture to pH 5.0 to 5.2. The mixture was stirred for two hours, with periodic addition of acid to maintain the acidity between 5.0 and 5.2. The mixture was centrifuged in a cup centrifuge and the clear extract was decanted from the meat residue.

To the meat residue were added 50 cc. of 70% aqueous methyl alcohol and the mixture was stirred one-half hour with the addition of hydrochloric acid as required. The mixture was centrifuged and the extract decanted.

The meat residue was extracted a third time in the same manner as in the second extraction.

The three extracts were pooled and suitably diluted portions thereof were assayed in mice against standard Insulin solutions and showed a potency equivalent to 5.6 units of Insulin per gram of pancreas (2550 units per pound of pancreas).

A crude Insulin solid containing a high proportion of the gland potency is recovered from the pooled extracts by the same procedure used in Example 1.

*Example 5.—Beef pancreas, with ethyl alcohol and calcium acetate*

Forty grams of minced frozen beef pancreas were added to 100 cc. of 92% aqueous denatured ethyl alcohol to which had previously been added 7.5 grams of calcium acetate dihydrate. Sufficient concentrated hydrochloric acid was added to adjust the acidity to pH 5.0 and the mixture was stirred for two hours. During this period hydrochloric acid was added as required to maintain the acidity between pH 5.0 and 5.2. The mixture was centrifuged in a cup centrifuge, the extract was decanted and the meat residue was re-extracted twice with 50 cc. quantities of 70% ethyl alcohol, without further addition of calcium acetate but with continued adjustment of the acidity as required, and the extracts were recovered.

The three extracts were pooled and suitably diluted for biological assay for Insulin activity. Tests indicated an activity equivalent to 8.0 units per gram of pancreas (3600 units per pound of pancreas).

A combined extract prepared in accordance with this example and containing calcium acetate instead of the sodium chloride of the preceding examples can be defatted and concentrated as in Example 1. The calcium acetate has the same effect as the sodium chloride, to precipitate from the final concentrate a crude Insulin solid containing a high proportion of the activity in the original glands.

*Example 6.—Pork pancreas, with ethyl alcohol and ammonium chloride*

To 100 cc. of 92% aqueous ethyl alcohol, to which had previously been added 19 grams of ammonium chloride, were added 40 grams of minced frozen pork pancreas. The mixture was stirred for two hours during which time concentrated hydrochloric acid was added to maintain the acidity within the range pH 5.0 to 5.2. The mixture was centrifuged and the extract saved.

The meat-and-salt residue was twice re-extracted with 50 cc. quantities of 70% aqueous alcohol by stirring for a one-half hour period. During these re-extractions acid was added as required to maintain the acidity in the range pH 5.0 to 5.2. The extracts were recovered.

The extracts were pooled and biologically assayed for Insulin, and showed a potency of 4.3 units per gram of pancreas (1950 units per pound of pancreas).

A combined extract prepared in accordance with this example and containing ammonium chloride instead of the sodium chloride of the preceding examples can be defatted and concentrated as in Example 1. The ammonium chloride has the same effect as the sodium chloride, to precipitate from the final concentrate a crude Insulin solid containing a high proportion of the activity in the original glands.

*Example 7.—Beef pancreas, with ethyl alcohol and sodium chloride*

The procedure of Example 2 is repeated, save that instead of using carbon tetrachloride as the fat-removal solvent, equivalent quantities of trichloroethylene and tetrachloroethylene are used. The results obtained correspond to those in Example 2.

I claim as my invention:

1. The process of recovering Insulin from Insulin-containing pancreas gland material, which comprises extracting the gland material at a pH between pH 3.5 and pH 6.5 with aqueous alcohol in the presence in the extraction mixture of salt of the class consisting of sodium chloride, calcium acetate, and ammonium chloride, using alcohol having not more than two carbon atoms and in a concentration and amount to produce in the resulting extract an alcohol concentration between about 45% and about 75%, and using salt in an amount to produce at least half saturation of the extract, concentrating the extract to partially reduce the alcohol content thereof and thereby decreasing the fat-solvent property thereof while substantially maintaining the Insulin in solution, treating the concentrated extract with a fat solvent to remove fat therefrom, concentrating the de-fatted extract to substantially remove the alcohol therein and cause the salt carried over from said extraction to become effective to salt-out from the so-treated extract a solid Insulin-containing material, and recovering such solid material.

2. The process of recovering Insulin from Insulin-containing pancreas gland material, which comprises extracting the gland material at a pH in the range from pH 3.5 to pH 6.5 with aqueous alcohol in the presence in the extraction mixture of salt of the class consisting of sodium chloride, calcium acetate, and ammonium chloride, using alcohol having not more than two carbon atoms and in a concentration and amount to produce in the resulting extract an alcohol concentration between about 65% and about 75%, and using salt in an amount to produce at least half saturation of the extract.

3. The process as defined in claim 2 in which said extraction is carried out at about pH 5.0 to 5.2.

4. The process as defined in claim 2 in which said salt is used in an amount to substantially saturate the extract.

5. The process of recovering Insulin from Insulin-containing pancreas gland material, which comprises extracting the gland material at a pH in the range from pH 3.5 to pH 6.5 with aqueous alcohol in the presence in the extraction mixture of an amount of sodium chloride to at least half saturate the liquid phase of the extraction mixture, using alcohol having not more than two carbon atoms and in a concentration and amount to produce in said liquid phase an alcohol concentration between about 65% and 75%.

6. The process of recovering Insulin from Insulin-containing pancreas gland material, which comprises extracting the gland material at a pH in the range from pH 3.5 to pH 6.5 with aqueous alcohol in the presence in the extraction mixture of an amount of calcium acetate to at least half saturate the liquid phase of the extraction mixture, using alcohol having not more than two carbon atoms and in a concentration and amount to produce in said liquid phase an alcohol concentration between about 65% and 75%.

7. The process of recovering Insulin from Insulin-containing pancreas gland material, which comprises extracting the gland material at a pH in the range from pH 3.5 to pH 6.5 with aqueous alcohol in the presence in the extraction mixture of an amount of ammonium chloride to at least half saturate the liquid phase of the extraction mixture, using alcohol having not more than two carbon atoms and in a concentration and amount to produce in said liquid phase an alcohol concentration between about 65% and 75%.

8. The process of obtaining Insulin from pancreas glands, which consists in extracting the pancreas glands with aqueous alcohol at a pH in the range from pH 3.5 to pH 6.5 and in the presence of salt of the class consisting of sodium chloride, calcium acetate, and ammonium chloride, which salts salt Insulin out of aqueous solution, with the salt present in an amount to produce at least half-saturation of the extract, the alcohol used being of the group consisting of ethyl and methyl alcohols and being used in a concentration and amount to produce in the resulting extract an alcohol concentration between about 45% and about 75%, treating the extract to remove fat, and evaporating alcohol from the resultant solution to convert it to a solution wherein said salting-out salt carried over from said extraction becomes effective to salt-out Insulin from the solution.

9. The process as set forth in claim 8, with the addition that the pH is adjusted prior to such salting-out to about pH 5.0 to 5.2.

10. The process of obtaining Insulin from pancreas glands, which consists in extracting the pancreas glands with aqueous alcohol at a pH of about pH 5.0 to 5.2 and in the presence of a salt of the class consisting of sodium chloride, calcium acetate, and ammonium chloride, which salts salt Insulin out of aqueous solution, with the salt present in an amount to produce at least half-saturation of the extract, the alcohol used being of the group consisting of ethyl and methyl alcohols and being used in a concentration and amount to produce in the resulting extract an alcohol concentration between about 45% and about 75%, treating the extract to remove fat, and evaporating alcohol from the resultant solution to convert it to a solution wherein said salting-out salt carried over from said extraction becomes effective to salt-out Insulin from the solution.

11. The process of obtaining Insulin from pancreas glands, which consists in extracting the pancreas glands with aqueous alcohol at a pH in the range from pH 3.5 to pH 6.5 and in the presence of a salt of the class consisting of sodium chloride, calcium acetate, and ammonium chloride, which salts salt Insulin out of aqueous solution, with the salt present in an amount to produce at least half-saturation of the extract, the alcohol used being of the group consisting of ethyl and methyl alcohols and being used in a concentration and amount to produce in the resulting extract an alcohol concentration of about 65% to about 70%, treating the extract to remove fat, and evaporating alcohol from the resultant solution to convert it to a solution wherein said salting-out salt carried over from said extraction becomes effective to salt-out Insulin from the solution.

12. The process of obtaining Insulin from pancreas glands, which consists in extracting the pancreas glands with aqueous alcohol at a pH in the range from pH 3.5 to pH 6.5 and in the presence of a salt of the class consisting of sodium chloride, calcium acetate, and ammonium chloride, which salts salt Insulin out of aqueous solution, with the salt present in an amount to produce substantial saturation of the extract, the alcohol used being of the group consisting of ethyl and methyl alcohols and being used in a concentration and amount to produce in the resulting extract an alcohol concentration between about 45% and about 75%, treating the extract to remove fat, and evaporating alcohol from the resultant solution to convert it to a solution wherein said salting-out salt carried over from said extraction becomes effective to salt-out Insulin from the solution.

References Cited in the file of this patent

UNITED STATES PATENTS 2,779,706    Homan _____ Jan. 29, 1957

OTHER REFERENCES

Jensen: "Insulin, Its Chemistry and Physiology," N.Y., The Commonwealth Fund, 1938, p. 32.

Gerlough et al.: J. Pharmacology, and Experimental Therapuetics, 45: 1, pp. 19–30, May 1932.